Patented Sept. 29, 1953

2,653,909

UNITED STATES PATENT OFFICE 2,653,909

SOLUBLE OILS COMPRISING NEUTRALIZED OXIDIZED PETROLEUM OILS

David Frazier, Bay Village, Ohio, assignor to The Standard Oil Company, Cleveland, Ohio, a corporation of Ohio No Drawing. Application December 28, 1949, Serial No. 135,537

13 Claims. (Cl. 252—34.7)

The present invention relates to novel machining lubricants of the emulsifiable type, to emulsions thereof with water and to a method of making said lubricants.

It is generally known, in machining operations such as cutting and grinding, that emulsions of water with so-called "soluble oils" may be used effectively to remove heat generated and chips formed during the operations, prolong tool life and improve the function of the work piece. Such emulsions are usually produced by emulsifying, with the aid of an emulsifying agent, one part of an oil with about 10 to 40 parts of water. In use, machining fluids are usually poured in a steady stream over the tool and the work piece, the oil content of the fluid being relied upon to provide lubricity between the work and the tool and thus counteract the heavy pressure therebetween, and the water component being relied upon to carry away the great amount of heat generated during the machining operation.

As a practical matter, a soluble oil must be clear and must emulsify with water to be commercially acceptable. In addition, chip settling, foaming, stability and rust protection are important characteristics of soluble oils from a commercial point of view. The stability of an emulsion of water and soluble oil is indicated by its appearance. The highest stability is indicated by a translucent appearance and a very high stability is indicated by a milky appearance. Progressively lesser degrees of stability are indicated by "slight," "moderate," "heavy," and "severe" creams. Even emulsions showing "severe" creams on standing can, however, be made homogeneous again by shaking. Although emulsions possessing heavy and severe creaming characteristics are somewhat less stable than those having slight or moderate creaming characteristics, they are nevertheless suitable for many commercial uses, especially where recirculation of the emulsion is involved and where anti-rust or anti-foam properties are of primary importance and stability and chip-settling ability are secondary considerations.

One of the disadvantages inherent in machining fluids of the emulsion type that are in use at present is that the conditions prevailing during machining operations are ideal for the growth of bacteria. Such bacteria are harmful because they promote a decomposition, manifested by the development of a sour, rancid smell of the oil component and because they are liable to cause skin infections. In present day practice, the machining fluid is changed and the machine is flushed when the bacterial count is about 100,000 colonies per gram. This count is usually attained after the fluid has been in use for about two weeks.

Another important disadvantage of such fluids is that their use requires articles machined therewith to be treated or slushed with an oil to prevent the formation of rust thereon.

It has now been found that a novel and superior soluble oil, which does not have this disadvantage and generally possesses the properties required and desired in a soluble oil, can be prepared by oxidizing a refined light (as opposed to heavy) lubricating oil having an A. S. T. M. aniline point of at least 105° C., an aromatic content below about 12% and containing less than 0.2% total sulfur, and then neutralizing the oil thus oxidized with a solution of a strong base.

The oil thus prepared is very stable, has excellent chip settling properties, and does not require the use of an emulsifying agent to form a stable emulsion with water when used in a machining operation in the form of a water emulsion. It is characterized by a much slower growth of bacteria, and therefore longer useful life, and its use eliminates the need for a rust preventative oil slushing step on the parts after machining.

The initial oil utilized in the method of this invention may be any solvent-extracted or white petroleum oil of low or high viscosity. Thus, for example, its viscosity may vary from about 75 to 600 SUS at 100° F.

The initial oil may be oxidized by any suitable method such as oxidation by passage of air therethrough. One preferred method of oxidizing highly solvent refined oils and white oils is that of passing air through the oil in the presence of a catalyst, such as manganese naphthenate or manganese stearate, while the oil is maintained at a temperature of between about 200° and 350° F. If the oil is less highly refined, it is preferable to bleed in slowly and in minor amounts, immediately after the start of the reaction, an aqueous solution of a strong base such as sodium or potassium hydroxide or carbonate. The oxidation is carried out for several hours until the oil has a saponification number between 20 and 80 and an A. S. T. M. neutralization number between about 12 and 25.

The neutralization of the oxidized oil is carried out with an amount of base at least about equal to the amount calculated to be necessary from the neutralization number of the oxidized oil.

From the standpoint of operability, there is no upper limit to the amount of base that can be used for the neutralization. To avoid undue darkening of the product and to keep the pH of the emulsion below about 10 and thereby avoid harsh effects on the human skin, however, it is generally preferable that the ratio of amount by weight of base used, to the amount by weight calculated to be required on the basis of the neutralization number of the oxidized oil to effect complete neutralization (referred to herein as the "base multiple"), be no more than about 5.

The base utilized in this operation may be any strong base such as an alkali metal base, e. g., potassium and sodium hydroxide, or a nitrogen base, e. g., ethylene diamine, ethanolamines, and equivalent nitrogen bases. Potassium hydroxide is preferred because oxidized oil neutralized therewith is generally less viscous and lighter in color than oxidized oils neutralized with sodium hydroxide and equivalent bases.

The neutralization is carried out in the presence of a mutual solvent for the base and the soap constituents in the neutralized oil. The term "soap" as used herein refers to the reaction products of the base with the oxidized components of the oil. The base is dissolved in the mutual solvent before addition to the oxidized oil.

The solvent may be any capable of dissolving both the base and the soap constituents. Typical among such solvents are mono- and polyhydric liquids such as water, methanol, ethanol, isopropyl alcohol and ethylene glycol.

The amount of solvent used may vary within wide limits but should be at least sufficient to dissolve all of the base utilized in the neutralization and not in excess of the amount forming a clear soluble oil.

The concentration of the soluble oil in water is largely a matter of choice depending upon the requirements in general and the severity of the machining operation in particular. Excellent results with reference to tool life, finish of the work piece, rust proofing, stability, bacteria count and chip settling ability have been obtained with machining fluids comprising water and the soluble oil of this invention in proportions as low as 40 to 1 and 80 to 1.

Is desired, the emulsion formed with the soluble oil of this invention may, of course, also contain additional material such as emulsifiers and the like.

While it is to be understood that the invention is not to be limited by any theory advanced herein, there is reason to believe that the neutralized oxidized oil of this invention is a homogeneous, uniform composition that is not analogous to the known two-component soluble oils. An additional component having emulsifying properties is not required to bring about a stable emulsion of the oil with water.

The more important advantages of the oil of this invention, therefore, are that it inhibits the growth of bacteria and is therefore serviceable for a longer period of time, it can be diluted to a much greater extent with water than known soluble oils without disadvantageously affecting the cutting ability of the fluid, it eliminates the need for a rust preventative oil slushing step, and it does not require the use of an emulsifying agent to effect a stable and permanent emulsion with water.

These and other advantages, as well as the utility of the invention will become more apparent from the following examples.

*Example 1*

6000 grams of a solvent-extracted oil having a viscosity of 115 SUS at 100° F. and an aniline point of 105° C. were oxidized overnight to a saponification number of 49.2 and a neutralization number of 14.8 by treatment with 120 cu. ft. of air per hour in the presence of 12 grams of manganese naphthenate and 6 drops of a "Dow Corning Type 200" silicone anti-foaming agent while the oil was maintained at a temperature of 245° F. 493 grams of the oil so oxidized, which had an optical density of 149, were then reacted with 26.3 cc. of an 11.1 normal solution of potassium hydroxide in water, this amount of potassium hydroxide representing a base multiple of 2.24, i. e., being equal to 2.24 times the amount calculated, on the basis of the neutralization number, to be necessary to effect complete neutralization. In this step, the potassium hydroxide solution was added slowly while the oil was well stirred.

The neutralized oxidized oil formed in accordance with this example was found to form a stable emulsion with from 5 to 80 times the amount of water.

An 80 to 1 emulsion thus formed was used in a continuous grinder. This grinder had been operated for a considerable time with a 40 to 1 emulsion of the best soluble oil on the market and had become thoroughly contaminated with bacteria in spite of the fact that the machine had been flushed out and a new emulsion had been used every two weeks.

The 80 to 1 emulsion proved to be quite satisfactory throughout the run. It was stable, gave excellent precipitation of the chips in the sump of the machine, and kept the splashboards and the interior of the machine much cleaner and freer of chips and oil accumulations than did the previous 40 to 1 emulsion. It also gave highly adequate rust protection in spite of its extremely high water content.

After two weeks of use, the 80 to 1 emulsion appeared just as good as it did when it was first put in the machine and a bacteriological assay on the emulsion showed 80,000 colonies per gram. Since the emulsion did not smell or look sour or rancid, the machine was used for another two weeks without changing the emulsion. At the end of the second two weeks the bacterial count was 60,000 bacteria per gram and the emulsion still had as good an appearance and performed as well as it did the first day it was put in.

*Example 2*

174,500 grams of solvent-extracted oil, having a viscosity of 115 SUS at 100° F., an aniline point of 105° C., and containing 320 grams of manganese naphthenate, were reacted with air, at the rate of 2000 cu. ft. of air per hour, while being maintained at a temperature of 300° F. for 12 hours. After the reaction was started, 240 grams of sodium hydroxide in 240 cc. of water were bled in slowly in a period of about one hour. The oil so oxidized was found to have a saponification number of 52.5 and a neutralization number of 15.

7930 grams of potassium hydroxide in 7930 grams of water were then poured into the oxidized oil and stirred for one hour, the base multiple being 3.04.

The oil thus prepared was likewise found to form a stable emulsion with from 5 to 80 times the amount of water.

An 80 to 1 emulsion formed with the soluble oil of this example was put into the same machine used in the test described in Example 1 after it had been drained and flushed. At the end of thirty days of continuous use, the bacterial count was found to be only 2700 colonies per gram. The emulsion was also found to be very stable and have excellent chip settling properties.

Examples 1 and 2 are believed to show that the oils of this invention have a very definite antiseptic action and give superior rust protection.

optical density and the ability of each sample to form a 1/10 emulsion with water, are likewise listed in the table below:

| Test No. | Volume 11.8 N KOH | Base Multiple | Vol. of Additional Water | Oil Appearance | Viscosity SUS at 100° F. | Optical Density | 1/10 Soluble Oil Emulsion |
|---|---|---|---|---|---|---|---|
| 1 | 2 | 0.63 | 0 | cloudy | | | none |
| 2 | 2 | 0.63 | 1 | cloudy | | | none |
| 3 | 2 | 0.63 | 2 | cloudy | 446 | | none |
| 4 | 3 | 0.945 | 0 | clear | 532 | 405 | severe cream |
| 5 | 3 | 0.945 | 1 | clear | 530 | 389 | severe cream |
| 6 | 3 | 0.945 | 2 | clear | 605 | 392 | heavy cream |
| 7 | 3 | 0.945 | 3 | clear | 700 | 372 | moderate cream |
| 8 | 3 | 0.945 | 4 | clear | 738 | 383 | moderate cream |
| 9 | 4 | 1.26 | 0 | clear | 837 | 585 | moderate cream |
| 10 | 4 | 1.26 | 1 | clear | 849 | 533 | slight cream |
| 11 | 4 | 1.26 | 2 | clear | 920 | 518 | slight cream |
| 12 | 4 | 1.26 | 3 | clear | 1060 | 526 | slight cream |
| 13 | 4 | 1.26 | 4 | clear | 900 | 526 | slight cream |
| 14 | 5 | 1.57 | 0 | clear | 935 | 889 | slight cream |
| 15 | 5 | 1.57 | 1 | clear | 1050 | 889 | milky |
| 16 | 5 | 1.57 | 2 | clear | 1215 | 889 | severe cream |
| 17 | 5 | 1.57 | 3 | clear | 920 | 889 | severe cream |
| 18 | 5 | 1.57 | 4 | separated | | | none |

Example 3

130,875 grams of a solvent-extracted oil, having a viscosity of 115 SUS at 100° F., an aniline point of 105° C., and containing 240 grams of manganese naphthenate, were reacted with air at the rate of 2000 cu. ft. of air per hour, while being maintained at 285° F., for 7½ hours. After the reaction was started, 180 grams of sodium hydroxide in 180 cc. of water were bled in slowly over a period of about one hour. The oil so oxidized was found to have a saponification number of 47.7 and a neutralization number of 15.5.

6820 cc. of a 50% solution of sodium hydroxide in water were added to the oxidized oil and stirred for one hour, the base multiple being 2.55.

This oil was used in 80 to 1 and 40 to 1 water emulsions in the milling and turning of HS and high carbon steel. It was found that at 80 to 1, the machining fluid formed with the oil of this invention gave the same tool life as a conventional and well known emulsion wherein the proportion of water to oil was 20 to 1. The 40 to 1 emulsion gave, on the average, a 50% greater tool life than the 80 to 1 emulsion. Both the emulsions were found to be stable and neither of them was conducive to foaming.

Example 4

A solvent-extracted oil having a viscosity of 115 SUS at 100° F. and an aniline point of 105° C. was oxidized to a saponification number of 59 and a neutralization number of 21. To 100 gram samples of the oxidized oil thus obtained, there were added, with thorough stirring, the volumes, in cubic centimeters, of water and of 11.8 N potassium hydroxide in water indicated in the table below. In each instance, a slight rise in temperature was noted when the caustic solution was added and the product became darker.

The base multiple, the appearance, viscosity,

The data in the table shows that under the conditions described, the base multiple should be at least about 0.945, that the total amount of water should not exceed about 8 ccs. per 100 grams of oil neutralized, that the presence of between about 3 and 9 ccs. of water per 100 grams of oil is required to make the neutralization operable and that optimum results are obtainable when the amount of water present is between about 5 and 8 ccs. per 100 grams of oil.

Further tests, with oils neutralized under the conditions of these tests which were subsequently blown with air on steam to constant weight to remove the water therein, showed, however, that the neutralized oxidized oils of this example must contain some water to be soluble.

Example 5

10 ccs. of an 11.4 N aqueous potassium hydroxide solution were added to 100 grams of an oxidized oil having a neutralization number of 21 and a saponification number of 63, the base multiple in this instance being 3.04.

The oil thus neutralized was clear and formed a stable slight cream emulsion with water.

Example 6

A good grade of solvent refined lubricating oil having a viscosity of 515 SUS at 100° F., a viscosity index of 88 and an aniline point of 118° C. was oxidized to a saponification number of 70 and a neutralization number of 14. 7.0 grams of commercial potassium hydroxide dissolved in 13 grams of methanol were added to one 100 gram sample of the oxidized oil and a like amount of potassium hydroxide dissolved in 13 grams of ethylene glycol was added to another 100 gram sample of the oxidized oil (a base multiple of 5). In each instance an immediate neutralization reaction occurred and the oils became dark, clear, and homogeneous.

10 parts by weight of the oils thus prepared formed, in each instance, very stable, translucent emulsions with 90 parts by weight of water.

Example 7

6000 grams of an uninhibited SAE 30 solvent-extracted motor oil having a viscosity of 440 SUS at 100° F. and an aniline point of 118° C. were oxidized for twelve hours to a saponification number of 60.3 and a neutralization number of 12 by treatment with 120 cu. ft. of air per hour in the presence of 120 grams manganese naphthenate and 120 grams of sodium carbonate while the oil was maintained at a temperature of 285° F.

The oxidized oil, which was very viscous and had a deep red color, was then neutralized with 540 cc. of a 45.3% solution of potassium hydroxide in water. The neutralized oil was dark red in color, perfectly clear and formed stable water emulsions.

The term "optical density" in the present disclosure represents the standard logarithmic ratio of intensity of an incident ray falling on a transparent or translucent medium to the intensity of the transmitted ray for a sample length of one meter and light of wave length from 5100 to 5500 Angstroms.

It is to be understood that innumerable variations and modifications will immediately become apparent to those skilled in the art upon reading the foregoing disclosure. The invention contemplates all such variations and modifications as come within the scope of the appended claims.

I claim:

1. A method of making a clear, soluble machining oil which comprises oxidizing a refined solvent-extracted lubricating oil having a viscosity ranging from about 75 to 600 SUS at 100° F., an A. S. T. M. aniline point of at least 105° C., an aromatic content below about 12% and containing less than 0.2% sulfur to a saponification number between about 20 and 80, and neutralizing the oxidized oil with a strong base dissolved in a mutual solvent for the base and the soap resulting from said neutralization.

2. A method as defined in claim 1 wherein the solvent is a member of the group consisting of water and alcohols.

3. A method as defined in claim 1 wherein the base is selected from the group consisting of alkali metal bases and nitrogen bases.

4. A clear, oxidized, neutralized soluble oil prepared by oxidizing a refined lubricating oil solvent extracted to have a viscosity ranging from about 75 to 600 SUS at 100° F., an A. S. T. M. aniline point of at least 105° C. and then neutralizing said oxidized oil with a strong base dissolved in a mutual solvent for the base and the soap resulting from said neutralization, said oil containing at least about 0.1% by weight of said solvent.

5. A soluble oil as defined in claim 4 wherein the solvent is a member of the group consisting of water and alcohols.

6. A soluble oil as defined in claim 4 wherein the base is selected from the group consisting of alkali metal bases and nitrogen bases.

7. A soluble oil as defined in claim 4 wherein the base is potassium hydroxide and the solvent is water.

8. A soluble oil as defined in claim 4 wherein the base is sodium hydroxide and the solvent is water.

9. A soluble oil as defined in claim 4 wherein the base is potassium hydroxide and the solvent is methanol.

10. A soluble oil as defined in claim 4 wherein the base is potassium hydroxide and the solvent is ethylene glycol.

11. A machining fluid comprising an emulsion of water with an oxidized, neutralized oil prepared by oxidizing a refined lubricating oil solvent extracted to have a viscosity ranging from about 75 to 600 SUS at 100° F., an A. S. T. M. aniline point of at least 105° C. and then neutralizing said oxidized oil with a strong base dissolved in a mutual solvent for the base and the soap resulting from said neutralization, said oil containing at least about 0.1% by weight of said solvent.

12. A machining fluid as defined in claim 11 wherein the solvent is a member of the group consisting of water and alcohols.

13. A machining fluid as defined in claim 11 wherein the base is selected from the group consisting of alkali metal bases and nitrogen bases.

DAVID FRAZIER.

References Cited in the file of this patent

UNITED STATES PATENTS

| Number | Name | Date |
|---|---|---|
| 1,817,599 | Hammond | Aug. 4, 1931 |
| 2,288,769 | Alleman | July 7, 1942 |
| 2,294,535 | Burwell | Sept. 1, 1942 |